US012591983B2

(12) United States Patent　　(10) Patent No.:　　US 12,591,983 B2
Takagi et al.　　(45) Date of Patent:　　Mar. 31, 2026

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Yutaka Takagi, Kanagawa (JP); Shunta Tate, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 340 days.

(21) Appl. No.: 18/338,520

(22) Filed: Jun. 21, 2023

(65) Prior Publication Data

US 2024/0013407 A1　　Jan. 11, 2024

(30) Foreign Application Priority Data

Jul. 8, 2022　　(JP) ................................. 2022-110586

(51) Int. Cl.
*G06T 7/246*　　　(2017.01)
*G06T 7/73*　　　(2017.01)
(Continued)

(52) U.S. Cl.
CPC ................ *G06T 7/246* (2017.01); *G06T 7/73* (2017.01); *G06V 10/44* (2022.01); *G06V 10/806* (2022.01); *G06T 2207/20084* (2013.01)

(58) Field of Classification Search
CPC . G06T 7/246; G06T 7/73; G06T 2207/20084; G06T 2207/20081;
(Continued)

(56) References Cited

U.S. PATENT DOCUMENTS

| | | | | |
|---|---|---|---|---|
| 10,204,283 B2 * | 2/2019 | Tate | ........................ | G06V 10/26 |
| 2023/0324543 A1 * | 10/2023 | Kulkarni | ................. | G06F 18/23 |
| 2023/0386078 A1 | 11/2023 | Soeda | | |

FOREIGN PATENT DOCUMENTS

| | | | | | |
|---|---|---|---|---|---|
| CN | 111008992 | * | 4/2020 | ............. | G06T 7/246 |
| CN | 113763415 | * | 12/2021 | ............. | G06T 7/207 |

(Continued)

OTHER PUBLICATIONS

Bertinetto, L. et al., "Fully-Convolutional Siamese Networks for Object tracking" arXiv:1606.09549v3 (Dec. 2021) pp. 1-16.
(Continued)

*Primary Examiner* — Jerome Grant, II
(74) *Attorney, Agent, or Firm* — Carter, DeLuca & Farrell LLP

(57) ABSTRACT

An information processing apparatus comprises a first computation unit configured to obtain first features of an image of a tracking target, a second computation unit configured to obtain second features of an image of a search region, a third computation unit configured to obtain an inference tensor representing likelihoods that the tracking target is present at respective positions of the image of the search region, using the first features and the second features, and a fourth computation unit configured to obtain an inference map representing a position of the tracking target in the image of the search region, using the inference tensor.

13 Claims, 9 Drawing Sheets

(51) Int. Cl.
    G06V 10/44          (2022.01)
    G06V 10/80          (2022.01)

(58) Field of Classification Search
    CPC .... G06V 10/44; G06V 10/806; G06V 10/454;
                 G06V 10/764; G06V 10/82; G06V 20/52
    USPC ........................................................ 382/103
    See application file for complete search history.

(56) References Cited

FOREIGN PATENT DOCUMENTS

| | | | | |
|---|---|---|---|---|
| CN | 110992404 | * | 9/2023 | ............. G06T 7/246 |
| JP | 2013-219531 A | | 10/2013 | |
| JP | 2013219531 | * | 10/2013 | |
| JP | 2021502645 A | | 1/2021 | |

OTHER PUBLICATIONS

Notice of Reasons for Refusal issued by the Japanese Patent Office on Feb. 9, 2026 in corresponding JP Patent Application No. 2022-110586, with English translation.

* cited by examiner

F I G. 1
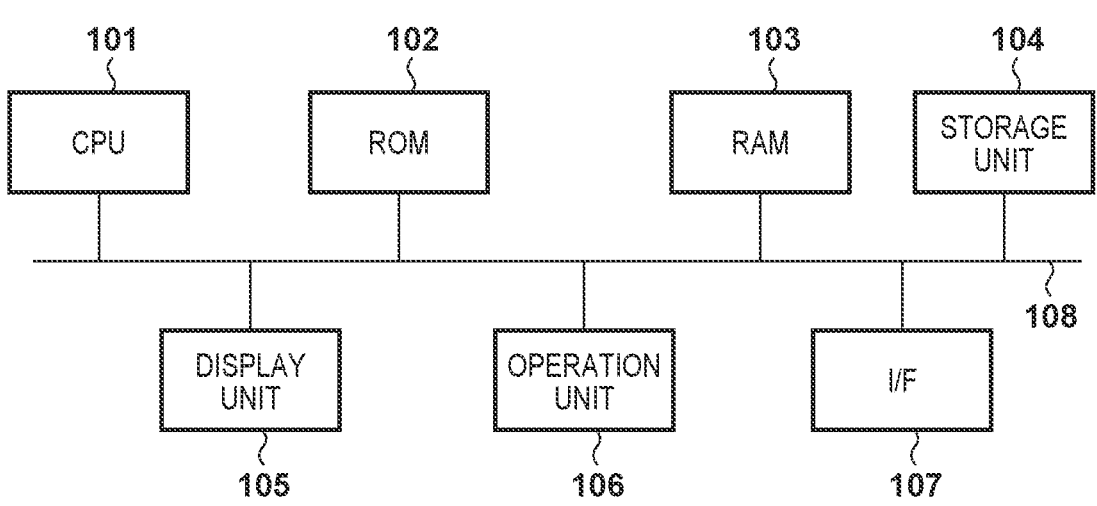
F I G. 2
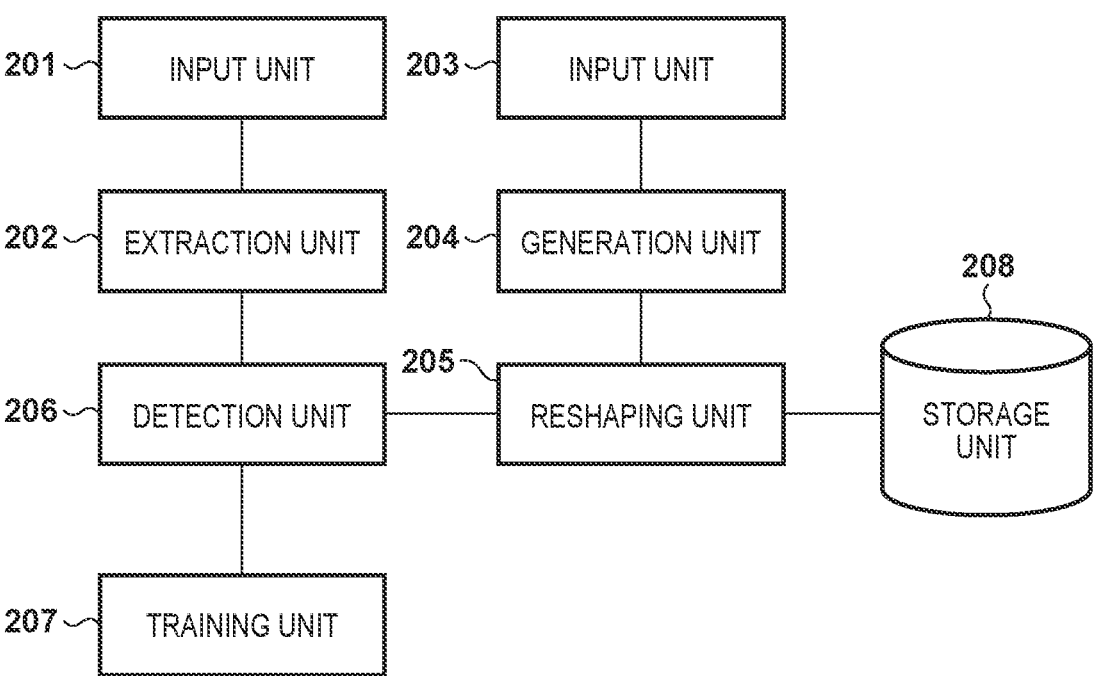

F I G. 9
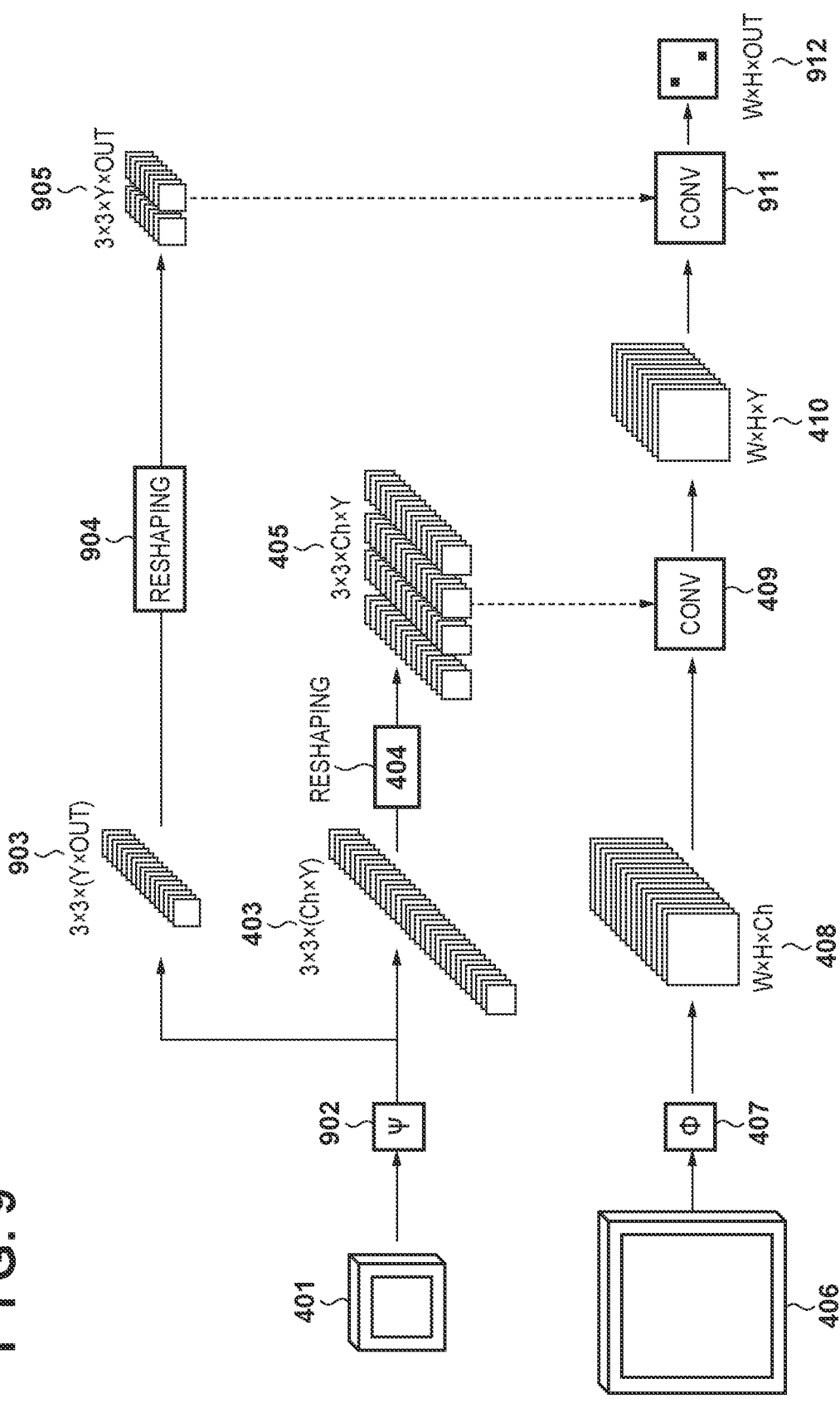

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to a technique for tracking a tracking target in an image.

Description of the Related Art

Although there are some techniques for tracking a particular object in an image, such as template matching and those in which luminance and color information are used, in recent years, techniques in which deep neural networks (DNNs) are used have been attracting attention as high-precision tracking techniques.

A technique described in "Fully-Convolutional Siamese Networks for Object Tracking" (arXiv 2016) is one of the techniques for tracking a particular object in an image. A position at which a tracking target is present in a search region image is identified by an image in which a tracking target is captured and a search region image being inputted to convolutional neural networks (CNNs) in which weights are the same and cross-correlation between respective outcomes obtained from the CNNs being calculated. In such a tracking technique, while a position of a tracking target can be accurately predicted, when an object similar to the tracking target is present in an image, erroneous tracking in which the similar object is erroneously tracked as the tracking target is likely to occur due to a cross-correlation value with respect to the similar object being high.

In a technique described in Japanese Patent Laid-Open No. 2013-219531, when an object similar to a tracking target is present in a vicinity of the tracking target, an attempt is made to reduce erroneous tracking of the similar object by predicting respective positions of the tracking target and the similar object. In the technique described in "Fully-Convolutional Siamese Networks for Object Tracking" (arXiv 2016), a tracking target is detected by features of a tracking target and features of a search image being extracted and a similarity being calculated for each channel.

However, in the method described in "Fully-Convolutional Siamese Networks for Object Tracking" (arXiv 2016), the similarities are calculated independently for each subset of the features, and so, when an object similar to the tracking target in some aspects, such as outline and color, is close by, erroneous tracking occurs.

SUMMARY OF THE INVENTION

The present invention provides a technique for reducing erroneous tracking of a tracking target.

According to the first aspect of the present invention, there is provided an information processing apparatus comprising: a first computation unit configured to obtain first features of an image of a tracking target; a second computation unit configured to obtain second features of an image of a search region; a third computation unit configured to obtain an inference tensor representing likelihoods that the tracking target is present at respective positions of the image of the search region, using the first features and the second features; and a fourth computation unit configured to obtain an inference map representing a position of the tracking target in the image of the search region, using the inference tensor.

According to the second aspect of the present invention, there is provided an information processing method to be performed by an information processing apparatus, the method comprising: obtaining first features of an image of a tracking target; obtaining second features of an image of a search region; obtaining an inference tensor representing likelihoods that the tracking target is present at respective positions of the image of the search region, using the first features and the second features; and obtaining an inference map representing a position of the tracking target in the image of the search region, using the inference tensor.

According to the third aspect of the present invention, there is provided a non-transitory computer-readable storage medium storing a computer program causing a computer to function as: a first computation unit configured to obtain first features of an image of a tracking target; a second computation unit configured to obtain second features of an image of a search region; a third computation unit configured to obtain an inference tensor representing likelihoods that the tracking target is present at respective positions of the image of the search region, using the first features and the second features; and a fourth computation unit configured to obtain an inference map representing a position of the tracking target in the image of the search region, using the inference tensor.

Further features of the present invention will become apparent from the following description of exemplary embodiments with reference to the attached drawings.

BRIEF DESCRIPTION OF THE DRAWINGS

FIG. 1 is a block diagram illustrating an example of a hardware configuration of an information processing apparatus.

FIG. 2 is a block diagram illustrating an example of a functional configuration of the information processing apparatus.

FIG. 9 is a diagram illustrating an operation for when convolution processing is performed a plurality of times.

DESCRIPTION OF THE EMBODIMENTS

Figure 3:
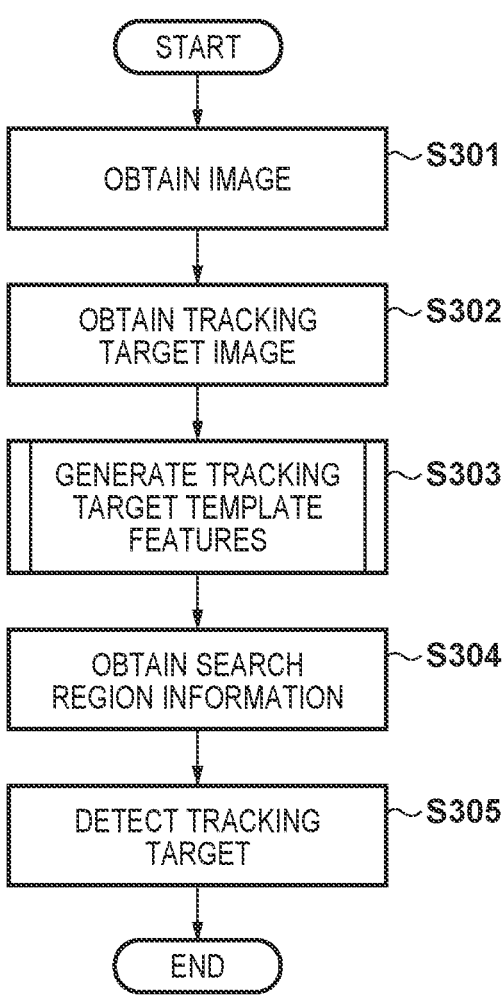
FIG. 3 is a flowchart of inference processing.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

First, an example of a hardware configuration of an information processing apparatus according to the present embodiment will be described with reference to a block diagram of FIG. 1. The hardware configuration illustrated in FIG. 1 is only one example and may be changed or modified as appropriate.

A CPU 101 performs various kinds of processing using computer programs and data stored in a ROM 102 and a RAM 103. The CPU 101 thus controls the operation of the entire information processing apparatus as well as executes or controls each of the processes described to be performed by the information processing apparatus.

The ROM 102 stores setting data of the information processing apparatus, a computer program and data related to activation of the information processing apparatus, a computer program and data related to a basic operation of the information processing apparatus, and the like.

The RAM 103 includes an area for storing computer programs and data loaded from the ROM 102 or a storage unit 104 and an area for storing information received from an external apparatus via an OF 107. In addition, the RAM 103 has a working area that the CPU 101 uses when performing various kinds of processing. The RAM 103 can thus provide various areas as appropriate.

The storage unit 104 is a large capacity information storage apparatus, such as a hard disk drive apparatus. The storage unit 104 stores an operating system (OS), computer programs, data, and the like for the CPU 101 to execute or control each of the processes described as processing to be performed by the information processing apparatus. The computer programs and data stored in the storage unit 104 are loaded into the RAM 103 as appropriate according to control by the CPU 101 and are to be processed by the CPU 101.

The storage unit 104 can be implemented with a medium (storage medium) and an external storage drive for realizing access to the medium. As such a medium, a flexible disk (FD), a CD-ROM, a DVD, a USB memory, an MO disc, a flash memory, and the like are known. The storage unit 104 may be a server apparatus or the like which the information processing apparatus can access via a network.

A display unit 105 is an apparatus including a liquid crystal screen, a touch panel screen, an organic EL display, and the like and can display a result of processing by the CPU 101 with images, characters, or the like. The display unit 105 may be a projection apparatus, such as a projector for projecting images and characters.

An operation unit 106 is a user interface, such as a keyboard, a mouse, and a touch panel and can input various instructions to the CPU 101 by being operated by the user. The operation unit 106 may be an external apparatus capable of communicating with the information processing apparatus. The operation unit 106 may be a pen tablet, or the display unit 105 and the operation unit 106 may be combined to form a tablet. As described above, devices with which a display function and an operation input function are implemented are not limited to a specific form.

The I/F 107 is a communication interface for performing data communication with an external apparatus. The CPU 101, the ROM 102, the RAM 103, the storage unit 104, the display unit 105, the operation unit 106, and the OF 107 are all connected to a system bus 108.

Next, an example of a functional configuration of the information processing apparatus is illustrated in a block diagram of FIG. 2. In the present embodiment, it is assumed that, among the functional units illustrated in FIG. 2, all of the functional units except a storage unit 208 are implemented by a computer program. In the following, the functional units of FIG. 2 (excluding the storage unit 208)

may be described as the performer of processing; however, in practice, functions of a functional unit are realized by the CPU 101 executing a computer program corresponding to that functional unit. Among the functional units illustrated in FIG. 2, some or all of the functional units except the storage unit 208 may be implemented by hardware. The storage unit 208 can be implemented by a memory apparatus, such as the RAM 103, the ROM 102, or the storage unit 104.

Next, processing (inference processing) performed by the information processing apparatus in order to output information indicating a position of a tracking target in an image as an inference map will be described in accordance with a flowchart of FIG. 3. Configuration may be such that the processing according to the flowchart illustrated in FIG. 3 is executed only by the information processing apparatus or by a plurality of apparatuses including the information processing apparatus performing a coordinated operation.

In step S301, an input unit 203 obtains an image including various objects (such as people, cars, animals, buildings, and trees). A method of obtaining an image is not limited to a particular obtainment method, and for example, an image may be obtained from the storage unit 208 or an external apparatus, such as an image capturing apparatus or a server apparatus connected via the OF 107.

In step S302, the input unit 203 obtains an image of a tracking target within an image region as a tracking target image from the image obtained in step S301. A method of obtaining a tracking target image is not limited to a particular obtainment method. For example, the image obtained in step S301 may be displayed on the display unit 105, and an image of a tracking target, specified by the user operating the operation unit 106, within an image region may be obtained as a tracking target image.

In step S303, a generation unit 204 generates tracking target template features representing features of the tracking target image as output of a CNN to which the tracking target image has been inputted by performing computation of that CNN. Then, a reshaping unit 205 reshapes the tracking target template features according to the number of dimensions of weight parameters of the CNN used by a detection unit 206.

In step S304, an input unit 201 obtains an input image and search region information indicating a range (image region) in which the tracking target is to be searched for in the input image. A method of obtaining an input image is not limited to a particular obtainment method, and for example, an input image may be obtained from the storage unit 208 or an external apparatus, such as an image capturing apparatus or a server apparatus connected via the OF 107. A method of obtaining search region information is not limited to a particular obtainment method, and for example, search region information may be obtained from the storage unit 208 or an external apparatus, such as a server apparatus connected via the OF 107. Information defining a region designated by the user operating the operation unit 106 may be obtained as the search region information. Then, an extraction unit 202 obtains an image in an image region indicated by the search region information from the input image as a search image and generates features (search region features) of the search image, as output of a CNN to which the search image has been inputted, by performing computation of that CNN.

In step S305, the detection unit 206 generates an inference tensor representing likelihoods that the tracking target is present at respective positions of the search image as output of a CNN in which the tracking target template features reshaped in step S303 are set as weight parameters by inputting the search region features into the CNN and performing computation of that CNN. Here, the weight parameters are parameters representing weight values between layers in the CNN. Then, the detection unit 206 generates an inference map indicating a position of the tracking target in the search image, as output of a CNN to which the inference tensor has been inputted, by performing computation of that CNN.

Figure 4:
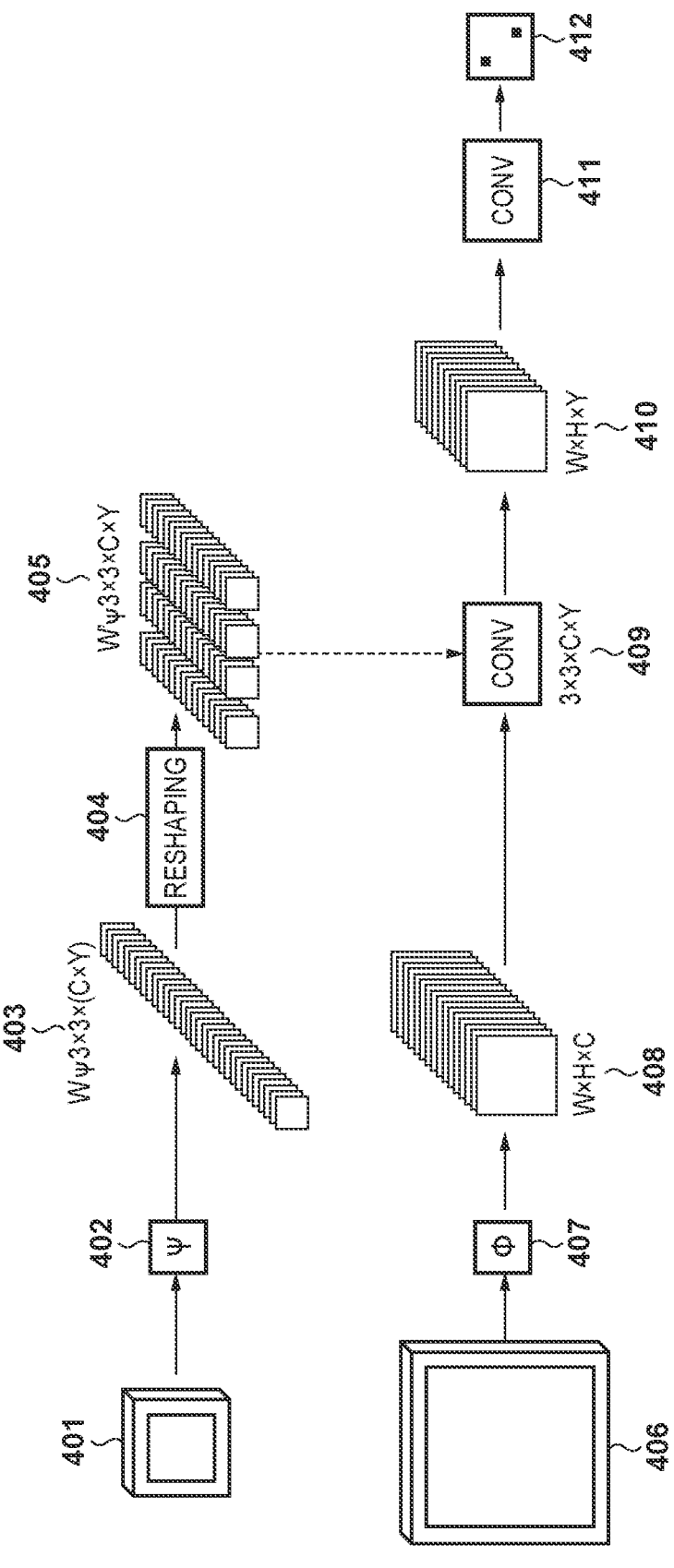
FIG. 4 is a diagram illustrating details of processing in step S303.

Details of the above-described processing in step S303 will be described with reference to FIG. 4. The generation unit 204 generates tracking target template features 403 as output of a CNN 402 by inputting a tracking target image 401 to the CNN 402 and performing computation of the CNN 402. The CNN 402 is a CNN trained in advance so that tracking target template features by which a tracking target and a non-tracking target are easily distinguished can be obtained. In the present embodiment, tracking target template features 405 obtained by reshaping the tracking target template features 403 according to the number of dimensions of weight parameters of a CNN 409 are used as the weight parameters of the CNN 409. Therefore, the CNN 402 is a CNN whose weights are independent of a CNN 407. The number of dimensions of the weight parameters of the CNN 409 is four, and for example, when 3×3×C×Y (C and Y are natural numbers), the dimensions of the tracking target template features 403 are set to be 3×3×CY.

The reshaping unit 205 reshapes (performs reshaping 404 of) the 3×3×CY tracking target template features 403 into the 3×3×C×Y tracking target template features 405. Reshaping methods include block division, shuffle division, and the like of dimensions, and the same reshaping method is used at the time of inference and learning.

Figure 5:
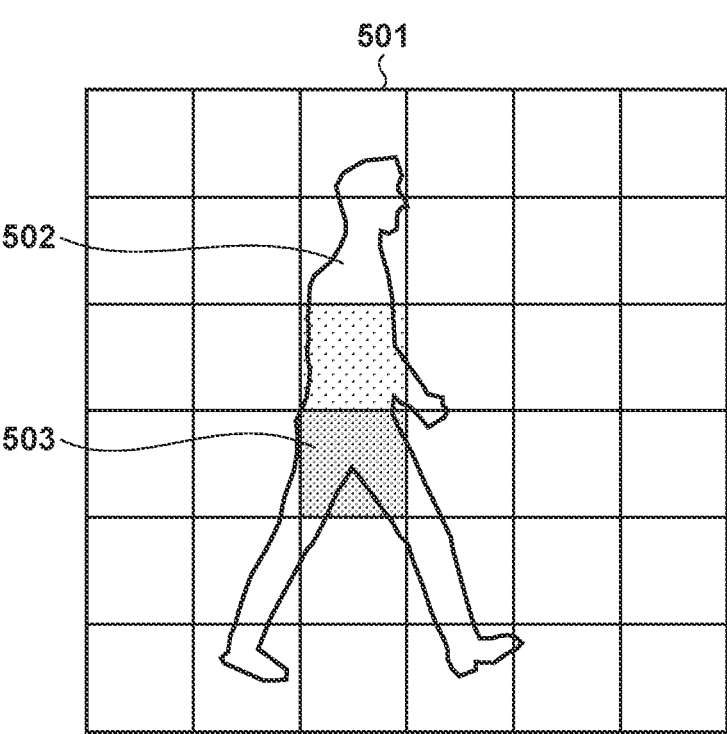
FIG. 5 is a diagram for explaining an inference map 412.

Next, details of the processing in the above-described steps S304 and S305 will be described with reference to FIGS. 4 and 5. The extraction unit 202 obtains an image within an image region indicated by the search region information from the input image as a search image 406. Then, the extraction unit 202 generates search region features 408, which are features of the search image 406, as output of the CNN 407 to which the search image 406 has been inputted, by performing computation of the CNN 407.

The detection unit 206 sets the tracking target template features 405 as the weight parameters of the CNN 409. The detection unit 206 generates an inference tensor 410 representing likelihoods that the tracking target is present at respective positions of the search image 406 by inputting the search region features 408 to the CNN 409 in which the tracking target template features 405 are set as weight parameters and computation of (performing convolutional operation of) the CNN 409. In "Fully-Convolutional Siamese Networks for Object Tracking" (arXiv 2016), cross-correlation is calculated by depthwise convolution of respective features of the tracking target image and the search region image; however, in the present embodiment, the CNN 409 is fully convolutional. When the dimensions of the search region features 408 are 3×3×C×Y (W, H, C, and Y are natural numbers) and the dimensions of the weight parameters of the CNN 409 are W×H×C, the dimensions of the inference tensor 410 is W×H×Y. At this time, regarding the tracking target template features 405, training is performed such that values of the inference tensor 410 corresponding to the positions at which the likelihoods that the tracking target is present in the search image 406 are high are increased. Then, the detection unit 206 generates an inference map 412 indicating positions of the tracking target in the search image

406 by computation of (performing a convolutional operation of) a CNN 411 to which the inference tensor 410 has been inputted.

The inference map 412 will be described with reference to FIG. 5. A "likelihood that a tracking target 502 is located in the square" is obtained for each position (each square) in a search image 501, and in FIG. 5, a likelihood in a square 503 near the center of the tracking target 502 indicates a high value. If a likelihood is greater than or equal to a threshold, the tracking target 502 can be estimated to be located at a position corresponding to the square 503.

Next, processing (CNN training processing) performed by the information processing apparatus so as to train the CNN 402, the CNN 407, and the CNN 411 mentioned in FIG. 4 will be described according to a flowchart of FIG. 6. The processing according to the flowchart illustrated in FIG. 6 may be executed only by the information processing apparatus or by a plurality of apparatuses including the information processing apparatus performing a coordinated operation.

In step S601, the input unit 203 obtains an image of an object to be a training target (an object that may be a tracking target) as a tracking target image. The method of obtaining a tracking target image is not limited to a particular obtainment method as mentioned in the above description related to step S302.

In step S602, the generation unit 204 generates tracking target template features representing features of the tracking target image, as output of the CNN 402 to which the tracking target image obtained in step S601 has been inputted, by performing computation of the CNN 402. Then, the reshaping unit 205 reshapes the tracking target template features according to the number of dimensions of weight parameters of the CNN used by the detection unit 206.

In step S603, the input unit 201 obtains an input image and search region information indicating a range (image region) in which an object to be a training target (an object that may be a tracking target) is to be searched for in the input image. The method of obtaining an input image and search region information is not limited to a particular obtainment method as mentioned in the above description related to step S304. The extraction unit 202 obtains an image within an image region indicated by the search region information from the input image as a search image.

In step S604, the extraction unit 202 generates search region features, which are features of the search image, as output of the CNN 407 to which the search image obtained in step S603 has been inputted, by performing computation of the CNN 407.

Figure 6:
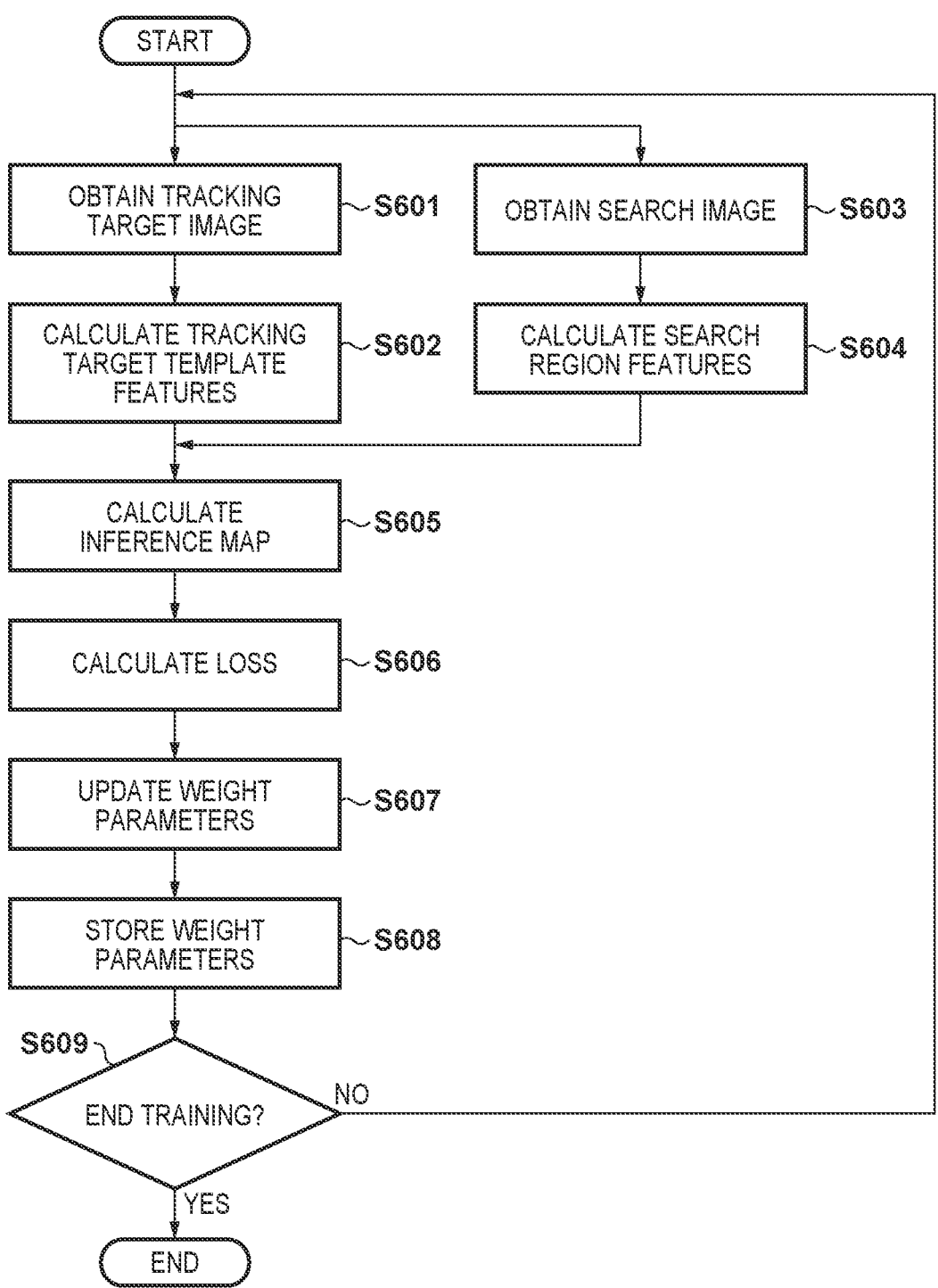
FIG. 6 is a flowchart of CNN training processing.

In the flowchart of FIG. 6, the processing of steps S603 and S604 and the processing of steps S601 and S602 are executed in parallel but are not limited to this, and these processes may be executed in sequence.

In step S605, the detection unit 206 sets the tracking target template features reshaped in step S602 as the weight parameters of the CNN 409. The detection unit 206 generates an inference tensor by inputting the search region features generated in step S604 to the CNN 409 in which the tracking target template features have been set as weight parameters and performing computation of the CNN 409. This inference tensor represents likelihoods that the training target is present at respective positions of the search image. Then, the detection unit 206 generates an inference map indicating positions of the training target in the search image by performing computation of the CNN 411 to which the inference tensor 410 has been inputted.

The purpose of the CNN training processing is to update the weight parameters of the respective CNNs such that a value corresponding to a position of a training target is high in an inference map and values at positions other than that of the training target are low.

In step S606, a training unit 207 obtains a difference between a map (training data) in which "1" is assigned to a position of a training target and "0" is assigned to positions other than the position of the training target in the search image and an inference map generated in step S605 as a loss. Cross-entropy loss, smooth L1 loss, or the like can be used as a loss function for obtaining loss.

In step S607, the training unit 207 updates the weight parameters of the CNN 402, the CNN 407, and the CNN 411 based on the loss obtained in step S606. At that time, in the reshaping 404, inverse conversion of the reshaping in the above-described inference processing is performed so as to propagate error to the CNN 402. As for the weight parameters of the CNN 409, the tracking target template features 405 are set, and so, an update is unnecessary. The weight parameters are updated based on back propagation using momentum SGD or the like.

In the present embodiment, output of a loss function for one image has been described for the sake of descriptive simplicity; however, when a plurality of images are targeted, a loss is calculated for a score that has been estimated for the plurality of images. Then, the weight parameters between CNN layers are updated such that the losses for the plurality of images are all less than a predetermined threshold.

In step S608, the training unit 207 stores the weight parameters (weight parameters of the CNN 402, the CNN 407, and the CNN 411) updated in step S607 in the storage unit 208. Then, when the CNN 402 is used in the above-described inference processing, the CNN 402 in which "weight parameters of the CNN 402" stored in the storage unit 208 are set is used. Similarly, when the CNN 407 is used in the above-described inference processing, the CNN 407 in which "weight parameters of the CNN 407" stored in the storage unit 208 are set is used. Similarly, when the CNN 411 is used in the above-described inference processing, the CNN 411 in which "weight parameters of the CNN 411" stored in the storage unit 208 are set is used.

In step S609, the training unit 207 determines whether a condition for ending training is satisfied. The condition for ending training is not limited to a particular end condition. For example, "the loss obtained in step S606 is less than or equal to the threshold", "the rate of change of the loss obtained in step S606 is less than or equal to the threshold", "the number of repetitions of the processing of step S601 to step S608 is greater than or equal to the threshold", or the like can be applied as the condition for ending training.

Various variations according to the present embodiment will be described below; however, in the descriptions according to respective variations, only differences from the first embodiment will be described, and unless otherwise mentioned, it is assumed that the embodiments are similar to the first embodiment.

First Variation

In the first embodiment, in the CNN training processing, the input unit 203 obtains an image of an object to be a training target (an object that may be a tracking target) as a tracking target image (positive). In the present variation, in the CNN training processing, the input unit 203 obtains an image of an object similar to the object to be the training target as a non-tracking target image (negative) in addition to the tracking target image.

Figure 7:
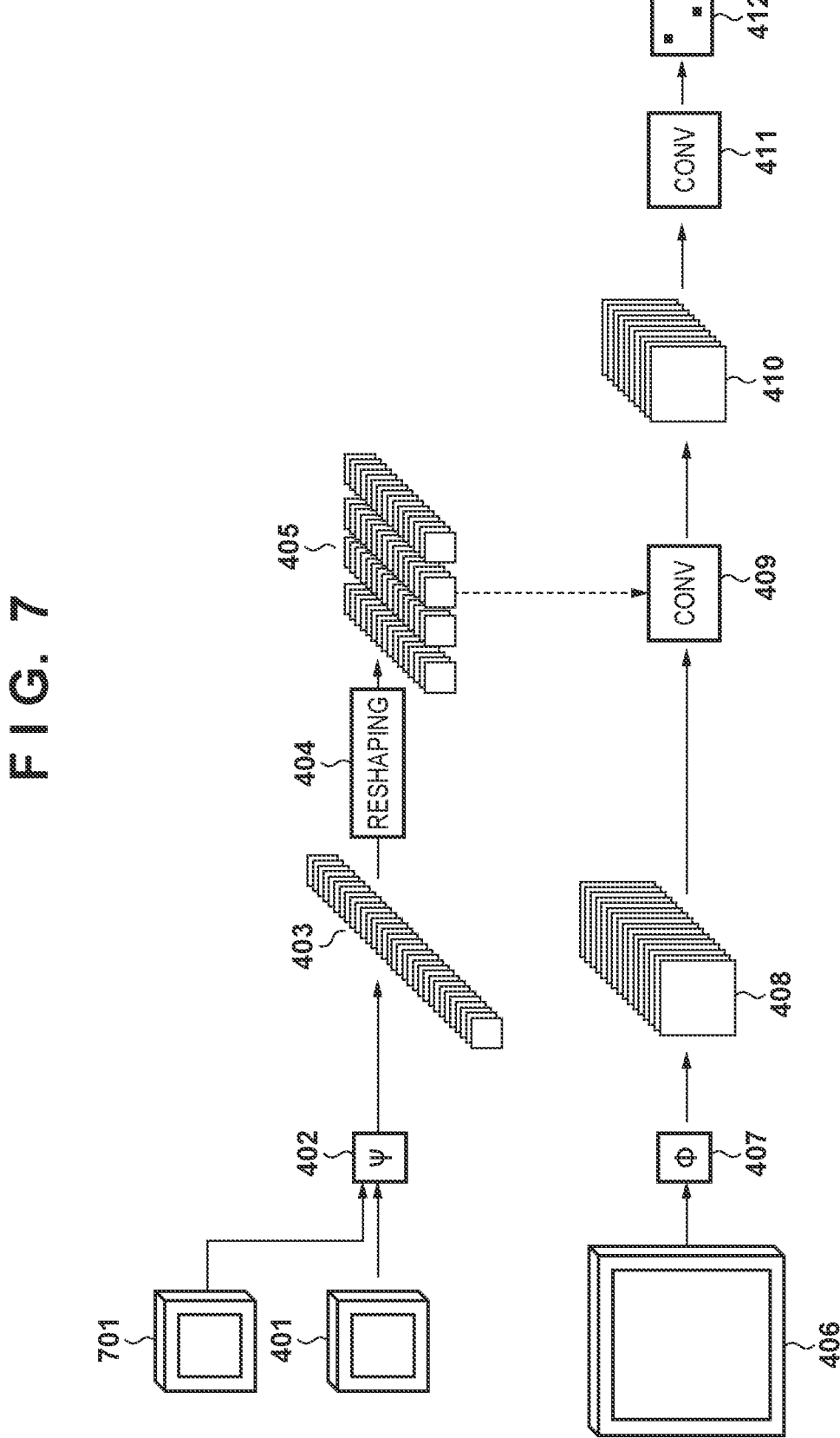
FIG. 7 is a diagram illustrating CNN training processing.

The CNN training processing according to the present variation will be described with reference to FIG. 7. The input unit 203 obtains a non-tracking target image 701 in addition to the tracking target image 401. Similarly to the tracking target image 401, a method of obtaining the non-tracking target image 701 is not limited to a particular obtainment method.

The generation unit 204 generates the tracking target template features 403 corresponding to a concatenated image in which the tracking target image 401 and the non-tracking target image 701 have been concatenated, as output of the CNN 402 to which the concatenated image has been inputted, by performing computation of the CNN 402.

The non-tracking target image 701 is not limited to an image of an object similar to the object to be the training target and may be an image of an object different from the object to be the training target, such as an image in which only the background is captured. The features of similar objects and backgrounds can thus be learned as negatives, and so, erroneous tracking can be reduced.

Second Variation

In the first embodiment, the reshaping unit 205 sets tracking target template features reshaped according to the number of dimensions of the weight parameters of a CNN used by the detection unit 206 as the weight parameters of the CNN. In the present variation, the reshaping unit 205 generates a combination of the tracking target template features and features prepared in advance as the weight parameters of the CNN. A method of generating weight parameters of a CNN according to the present variation will be described with reference to FIG. 8.

Figure 8:
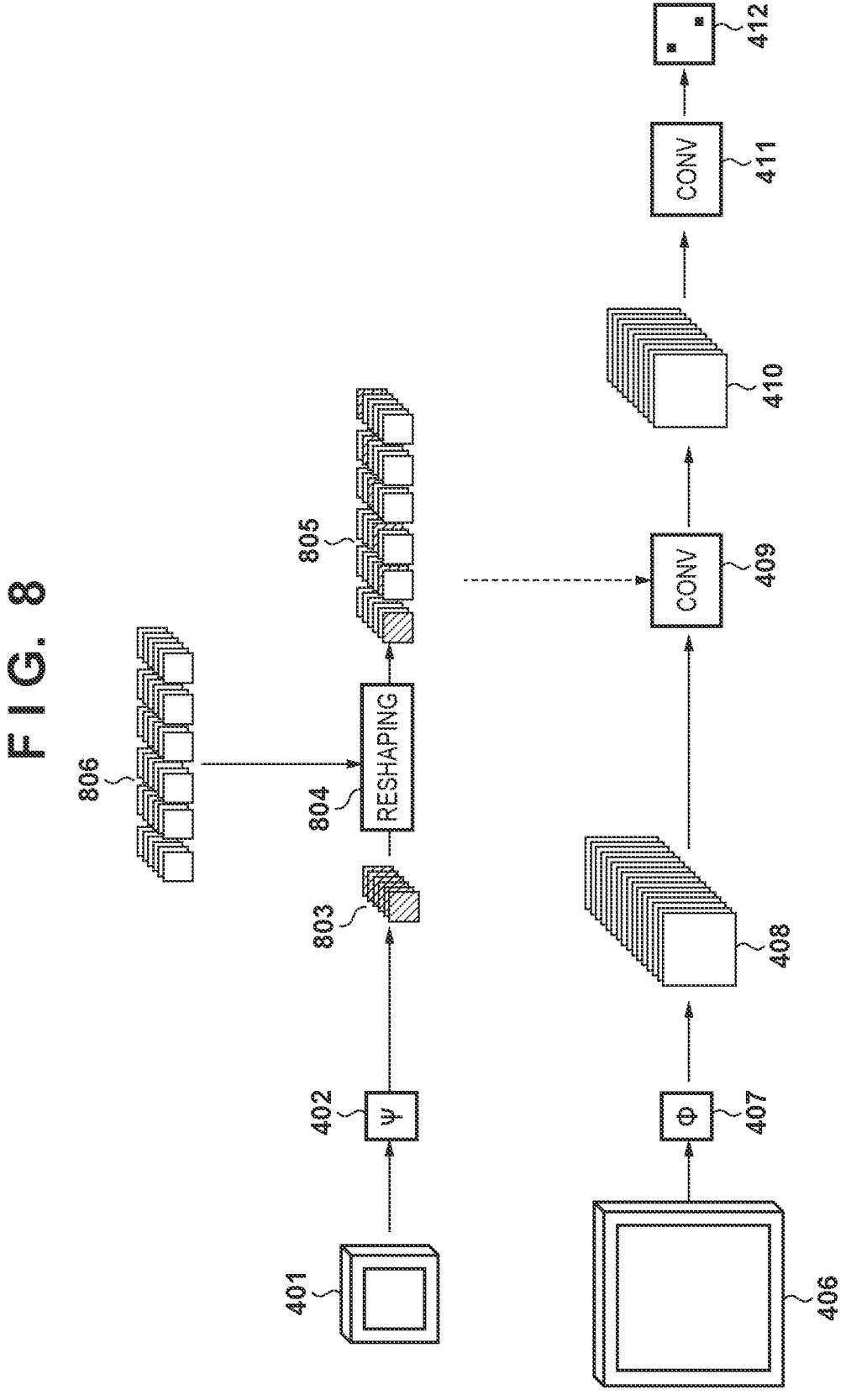
FIG. 8 is a diagram illustrating a method of generating CNN weight parameters.

The generation unit 204 generates tracking target template features 803 as output of the CNN 402 by inputting the tracking target image 401 to the CNN 402 and performing computation of the CNN 402. The reshaping unit 205 generates tracking target template features 805 by concatenating (combining) (performing reshaping 804 of) the tracking target template features 803 and features 806 stored in advance in the storage unit 208. A "reshape addition" may be applied instead of "concatenation (combination)". Here, the features 806 are weights which have been learned in advance so as to be able to detect a tracking target. In the example of FIG. 8, some of the dimensions of the features 806 are replaced with the tracking target template features 803. For example, when the dimensions of the tracking target template features 803 are 3×3×16 and the dimensions of the features 806 is 3×3×16×16, the reshaping unit 205 generates 3×3×16×16 tracking target template features 805 by replacing some of the dimensions of the features 806 with the tracking target template features 803. In the storage unit 208, the features 806 are held for respective categories of objects, such as a person, a car, and an animal. The reshaping unit 205 obtains the features 806 corresponding to a category of a target object from the storage unit 208 and concatenates (combines) it with the tracking target template features 803. The tracking accuracy can be improved by thus combining the weights calculated from the tracking target image 401 and the weights sufficiently trained in advance.

Third Variation

In the second variation, the CNN 402 and the CNN 407 are separate CNNs having weight parameters that are different from each other; however, the same CNN may be applied to the CNN 402 and the CNN 407. By applying the same CNN to the CNN 402 and the CNN 407, when the search image 406 is used as the tracking target image 401, for example, the tracking target template features 803 and the search region features 408 will be the same. Therefore, it is unnecessary to obtain both the tracking target template features 803 and the search region features 408 (it is only necessary to obtain either), and the overall processing can be sped up. Furthermore, the CNN 409 encompasses the depthwise convolution of "Fully-Convolutional Siamese Networks for Object Tracking" (arXiv 2016) and, therefore, is able to achieve a higher tracking accuracy than in "Fully-Convolutional Siamese Networks for Object Tracking" (arXiv 2016).

Fourth Variation

In the first embodiment, computation (convolution processing) according to a CNN in which weight parameters based on tracking target template features calculated from the tracking target image 401 are set is performed only once; however, it may be performed a plurality of times. The operation for such a case where convolution processing is performed a plurality of times will be described with reference to FIG. 9.

The generation unit 204 generates the tracking target template features 403 and tracking target template features 903 as output of a CNN 902 by inputting the tracking target image 401 to the CNN 902 and performing computation of the CNN 902. Here, dimensions of the search region features 408 are W×H×Ch, dimensions of the tracking target template features 403 are 3×3×(Ch×Y), dimensions of the tracking target template features 405 are 3×3×Ch×Y, and dimensions of the tracking target template features 903 are 3×3×(Y×OUT).

The reshaping unit 205 generates tracking target template features 905 having 3×3×Y×OUT dimensions by reshaping (performing reshaping 904 of) the tracking target template features 903 according to the number of dimensions of weight parameters of the CNN 411.

The detection unit 206 generates the inference map 412 having W×H×OUT dimensions by inputting the inference tensor 410 having W×H×Y dimensions to a CNN 911 in which the tracking target template features 905 are set as weight parameters and performing computation of the CNN 911.

In the training processing, the CNN 911 does not update weight parameters similarly to the CNN 409. By thus generating a plurality of weights and performing a plurality of layers of convolution processing, complicated and nonlinear processing according to the tracking target image 401 can be performed, and thereby detection accuracy is improved.

Fifth Variation

Figure 10:
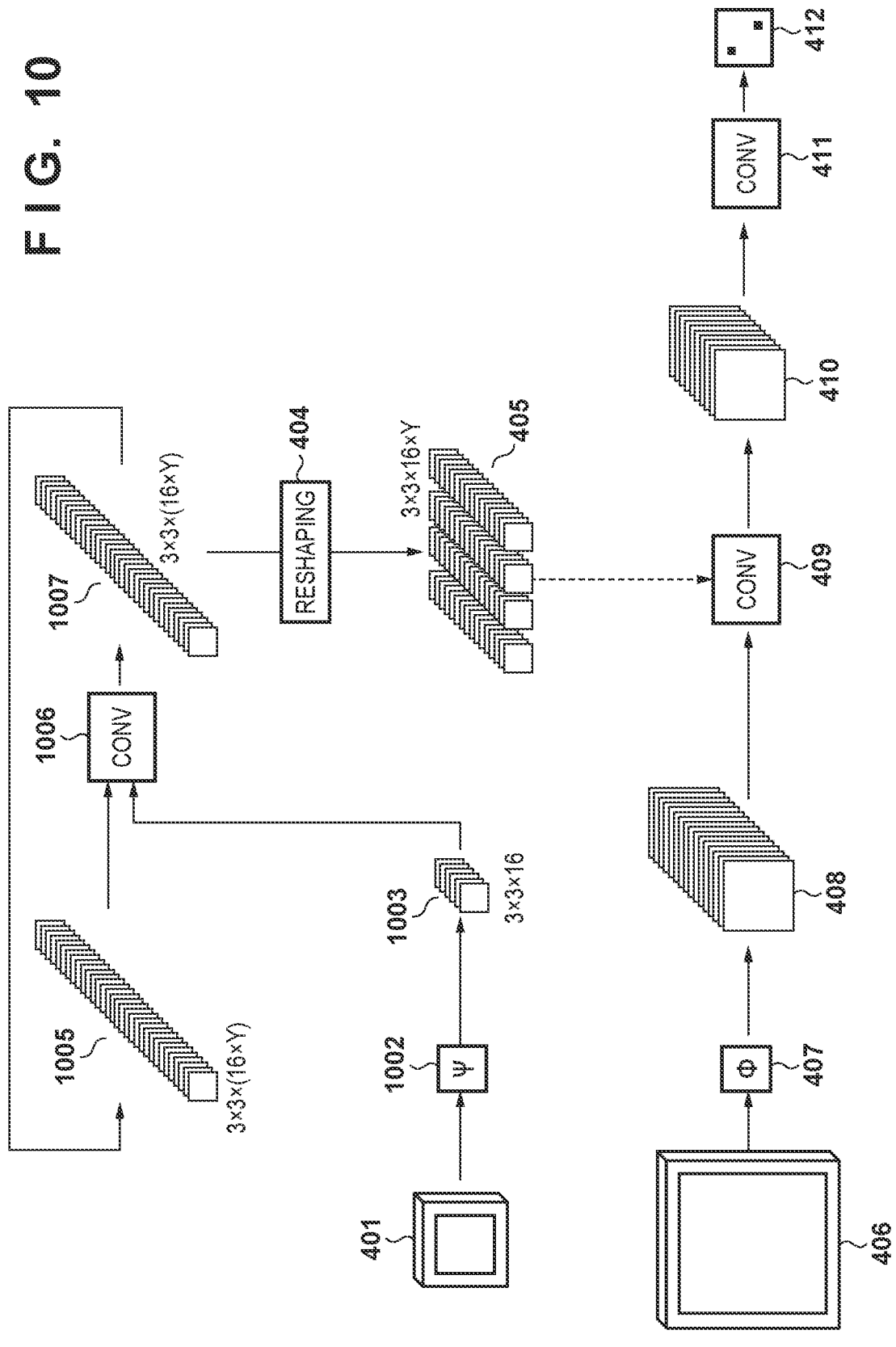
FIG. 10 is a diagram illustrating processing for generating tracking target template features.

In the first embodiment, the generation unit 204 generates tracking target template features only from an image obtained by the input unit 203; however, in addition to the image, tracking target template features may be generated using previously generated tracking target template features. The processing for generating tracking target template features according to the present variation will be described with reference to FIG. 10.

The generation unit 204 generates tracking target template features 1003 (dimensions: 3×3×16) by inputting the tracking target image 401 into a CNN 1002 and performing computation of the CNN 1002 and inputs the generated tracking target template features 1003 to a CNN 1006. The generation unit 204 also reads out previously obtained tracking target template features 1005 (dimensions: 3×3× (16×Y)) from the storage unit 208 and inputs it to the CNN 1006. Then, the generation unit 204 generates tracking target template features 1007 (dimensions: 3×3×(16×Y)) by performing computation of the CNN 1006 to which the tracking target template features 1003 and the tracking target template features 1005 have been inputted.

The reshaping unit 205 generates the tracking target template features 405 (dimensions: 3×3×16×Y) obtained by reshaping (performing the reshaping 404 of) the tracking target template features 1007 according to the number of dimensions of weight parameters of the CNN 409.

Instead of inputting the previously obtained tracking target template features 1005 as is to the CNN 1006, a moving average of the previously obtained tracking target template features 1005 may be inputted to the CNN 1006.

Further, instead of the CNN 1006, a gated recurrent unit (GRU), a long short-term memory (LSTM), or the like may be used.

Further, instead of inputting the tracking target template features 1005 to the CNN 1006, the tracking target template features 1007 may be generated by integrating the tracking target template features 1005 into a computational result of the CNN 1006 to which the tracking target template features 1003 have been inputted. Integration methods include a method of calculating a moving average and a method of performing convolution by concatenation. In this way, even when the appearance of the tracking target has changed or the tracking target is occluded, it is possible to prevent detection accuracy from decreasing.

As described above, by virtue of the first embodiment and the variations thereof, even when an object similar to the tracking target is close to the tracking target, it is possible to reduce erroneous tracking in which the similar object is tracked.

Second Embodiment

The information processing apparatus described in the first embodiment and the variations thereof may be a device, such as a personal computer (PC), a tablet terminal apparatus, or a smartphone. In such a case, the information processing apparatus may be configured by such one device, or by a plurality of devices. In the latter case, the respective devices do not need to have the same configurations, and in such a case, the information processing apparatus may be a collection of devices each having a role, such as one or more devices that execute processing according to the above-described flowcharts, devices that function as a storage, and the like.

In the first embodiment and the variations thereof, a form in which the inference processing and the CNN training processing are performed by one apparatus has been described; however, the respective processes may be performed by separate apparatuses. In such a case, an apparatus that performs the inference processing performs the inference processing using a CNN generated by an apparatus that performs the CNN training processing.

The numerical values; processing timings; processing order; processing performers; composition (including the number of dimensions), obtainment methods, transmission destinations, transmission sources, and storage locations of data (information); and the like used in each of the above-described embodiments and variations have been given as examples for the sake of providing a specific explanation and are not intended to be limited to such examples.

Further, some or all of the above-described embodiments and variations may be used in combination as appropriate. Further, some or all of the above-described embodiments and variations may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-110586, filed Jul. 8, 2022, which is hereby incorporated by reference herein in its entirety.

What is claimed is:

1. An information processing apparatus comprising:
   at least one processor; and
   at least one memory storing instructions, which when executed by the processor, cause the information processing apparatus to:
   obtain first features of an image of a tracking target;
   obtain second features of an image of a search region;
   obtain an inference tensor representing likelihoods that the tracking target is present at respective positions of the image of the search region, using the first features and the second features; and
   obtain an inference map representing a position of the tracking target in the image of the search region, using the inference tensor,
   wherein the inference map representing the position of the tracking target in the image of the search region is obtained, using third features of the image of the tracking target and the inference tensor.

2. The information processing apparatus according to claim 1, wherein the instructions, when executed by the processor, further cause the information processing apparatus to:
   reshape the first features into features whose number of dimensions is that of the inference tensor.

3. The information processing apparatus according to claim 2, wherein the apparatus further includes:
   convolutional neural networks (CNNs), and
   wherein the CNN obtains the inference tensor by inputting the second features to the CNN in which the first features reshaped are set as weight parameters and performing computation of the CNN, and
   wherein the CNN is fully convolutional.

4. The information processing apparatus according to claim 3, wherein the first features and the second features are obtained by different CNNs.

5. The information processing apparatus according to claim 3, wherein the first features and the second features are obtained by the same CNN.

6. The information processing apparatus according to claim 1, wherein the instructions, when executed by the processor, further cause the information processing apparatus to:
   reshape the first features by combining the first features with features held in advance.

7. The information processing apparatus according to claim 1, wherein the instructions, when executed by the processor, further cause the information processing apparatus to:
   reshape features obtained based on the first features and the first features previously obtained by the first computation unit.

8. The information processing apparatus according to claim 1, the instructions, when executed by the processor, further cause the information processing apparatus to:
   obtain an inference tensor representing likelihoods that a training target is present at respective position of an image of a search region, using first features of an image of the training target and second features of the image of the search region; and
   obtain an inference map representing a position of the training target in the image of the search region, using the inference tensor,
   wherein the inference map is used for training.

9. The information processing apparatus according to claim 1, the instructions, when executed by the processor, further cause the information processing apparatus to:
   obtain an inference tensor representing likelihoods that a training target is present at respective position of an image of a search region, using first features of an image in which an image of the training target and an image of a target different from the training target are concatenated and second features of the image of the search region; and
   obtain an inference map representing a position of the training target in the image of the search region, using the inference tensor,
   wherein the inference map is used for training.

10. An information processing method to be performed by an information processing apparatus, the method comprising:
    obtaining first features of an image of a tracking target;
    obtaining second features of an image of a search region;
    obtaining an inference tensor representing likelihoods that the tracking target is present at respective positions of the image of the search region, using the first features and the second features; and obtaining an inference map representing a position of the tracking target in the image of the search region, using third features of the image of the tracking target and the inference tensor.

11. The information processing method according to claim 10, wherein the inference tensor is obtained by inputting the second features to the CNN in which the first features reshaped are set as weight parameters and performing computation of the CNN, and wherein the CNN is fully convolutional.

12. A non-transitory computer-readable storage medium storing a computer program causing a computer to function as:

at least one processor; and at least one memory storing instructions, which when executed by the processor, cause the information processing apparatus to:

obtain first features of an image of a tracking target;

obtain second features of an image of a search region;

obtain an inference tensor representing likelihoods that the tracking target is present at respective positions of the image of the search region, using the first features and the second features; and obtain an inference map representing a position of the tracking target in the image of the search region, using the inference tensor, wherein the inference map representing the position of the tracking target in the image of the search region is obtained, using third features of the image of the tracking target and the inference tensor.

13. The non-transitory computer-readable storage medium according to claim 12, wherein the inference tensor is obtained by inputting the second features to the CNN in which the first features reshaped are set as weight parameters and performing computation of the CNN, and wherein the CNN is fully convolutional.

* * * * *